March 14, 1939.  C. J. YOUNG  2,150,572
SYNCHRONOUS MOTOR SPEED CONTROL MEANS
Original Filed Sept. 28, 1935
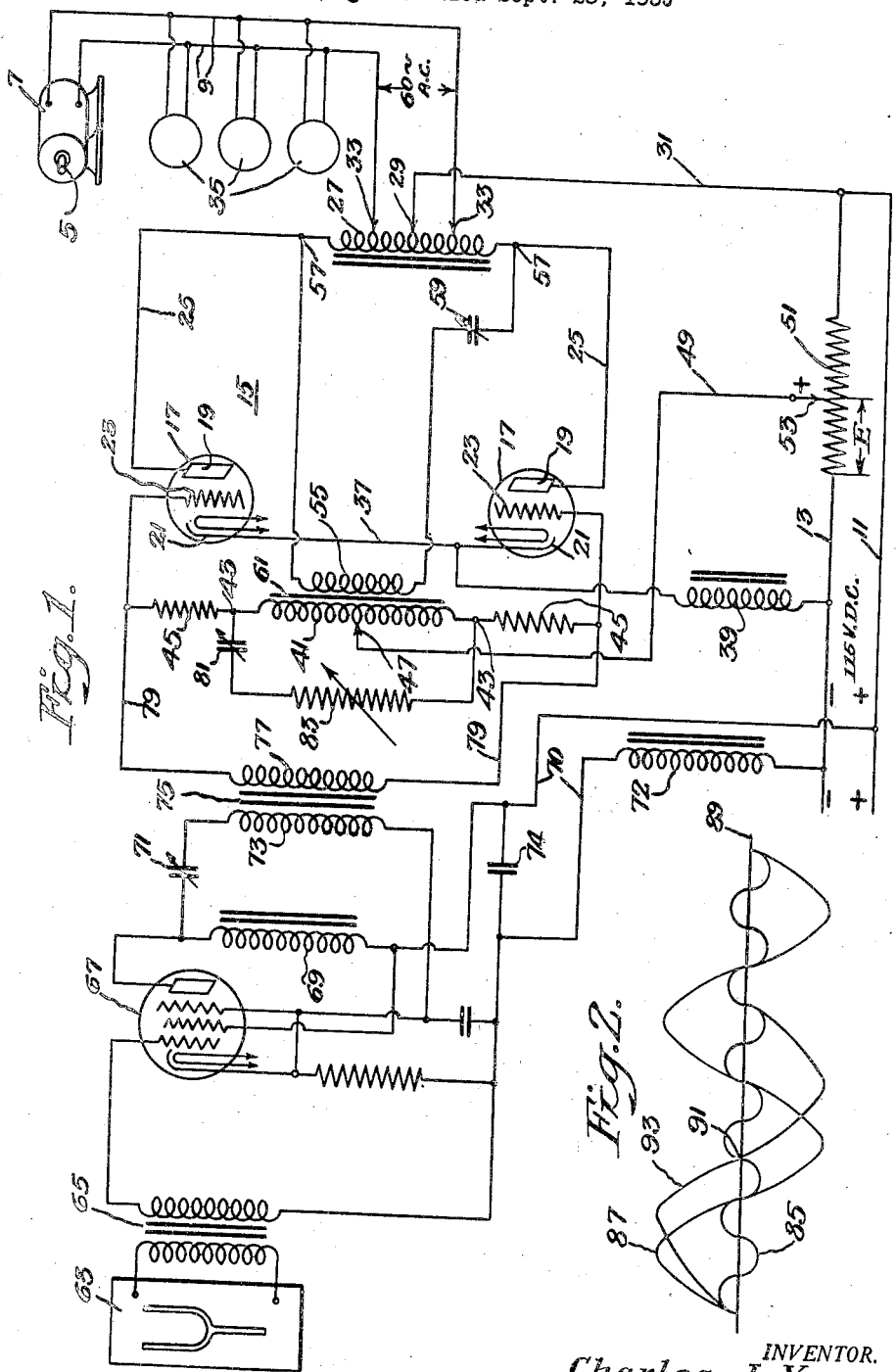
INVENTOR.
Charles J. Young
BY
ATTORNEYS.

Patented Mar. 14, 1939

2,150,572

UNITED STATES PATENT OFFICE 2,150,572

SYNCHRONOUS MOTOR SPEED CONTROL MEANS

Charles J. Young, Haverford, Pa., assignor to Radio Corporation of America, a corporation of Delaware Original application September 28, 1935, Serial No. 42,628, now Patent No. 2,113,165, dated April 5, 1938. Divided and this application November 28, 1936, Serial No. 113,113

4 Claims. (Cl. 250—36)

The present invention relates to synchronous motor speed control means, and is a division of my copending application, Serial No. 42,628, filed September 28, 1935, Patent No. 2,113,165, granted April 5, 1938, for Synchronous motor speed control means.

It is a primary object of the present invention to provide an electrical speed control system adapted to provide a variable frequency power output for motor control, whereby precise speed control of a rotating shaft from a fixed frequency standard or source of fixed frequency may be provided.

It is also a further object of the invention to provide an electrical speed control system embodying a tuning fork oscillator as a frequency standard and means for deriving therefrom power at a plurality of differing frequencies corresponding to differing motor speeds.

It is also an object of the present invention to provide a sub-multiple frequency generator embodying an electrically driven tuning fork as an oscillation source, an inverter system embodying a pair of balanced inverter devices and a controlling frequency dividing oscillatory circuit in connection with said inverter, whereby a change in output frequency and corresponding speed control may be effected by a simple control means.

The invention will, however, be better understood from the following description, when considered in connection with the accompanying drawing, and its scope will be pointed out in the appended claims.

In the drawing,

Fig. 1 is a schematic circuit diagram of a synchronous motor speed control system embodying the invention, and Fig. 2 is a series of curves illustrating the mode of operation of the system of Fig. 1.

Referring to Fig. 1, 5 is a rotary shaft which it is desired to operate at a plurality of different predetermined speeds. For this purpose, the shaft is synchronously driven and, in the present example, is illustrated as the shaft of a synchronous motor 7 connected with supply mains 9 which receive energy from a direct current source represented by positive and negative supply means 11 and 13 through an electric discharge inverter 15.

The inverter comprises a pair of electric discharge devices 17 arranged in balanced relation to each other in connection with balanced input and output circuits. The electric discharge devices 17 are controllable rectifiers and are preferably of the electro-statically controlled arc rectifier type. Such rectifier devices are commercially available and well known on the commercial market as "Thyratrons." These devices each comprise an anode 19, a hot cathode 21, and a grid 23. As is well known, the grid may be biased to prevent the starting of anode current but is ineffective to stop the flow of anode current. Any suitable gas discharge device of this type adapted for use as a rectifier or inverter with a control grid may be used.

A balanced output circuit for the devices 17 is indicated at 25—25 and includes a balanced output choke coil or auto transformer 27 having a center tap 29 connected through a positive anode supply lead 31 with a positive direct current supply main 11. The alternating current power output circuit 9 for the motor 7 is connected with tap 33 on opposite sides of the center tap 29 on the output choke coil or transformer 27. As shown, the device 27 provides a step down auto transformer between the anode circuit of the rectifier or inverter and the load circuit 9. Other synchronous devices such as electric timing devices and the like may be connected to the load circuit 9 as indicated at 35.

The cathodes 21 are connected together by a lead 37 which, in turn, is connected through a choke coil 39 with the negative direct current supply main 13, thereby completing the balanced anode circuit for the inverter.

The inverter input circuit comprises an inductance 41, having terminals 43 connected through series impedance devices 45 with the control grids 23. The inductance 41 is provided with a center tap 47 provided with a connection lead 49 for bias control means comprising a potentiometer resistor 51 connected in shunt relation with the direct current supply means 11 and 13 and having a movable tap 53 connected with the lead 49.

It will be seen that with this arrangement a positive biasing potential E with respect to cathode is placed upon the control grids 23, which potential may be adjusted by a movement of the contact 53 along the potentiometer 51. It will be seen that a balanced input circuit is provided comprising each half of the inductance 41 and the series impedances 45 with a cathode return to the bias supply means 51—53 and the choke coil 39. A choke coil 39 is, therefore, located adjacent to the cathodes in both the input and the output circuits of the inverter, and its function will hereinafter be referred to.

The inversion frequency is supplied by a feed back winding 55 connected across the terminals 57 of the output impedance 27 through a series capacitor 59. The feed back winding 55 is inductively coupled with the input winding 41 of the inverter, as indicated, and may comprise the primary winding of a transformer, the core of which is indicated at 61.

In the present example, the step-up ratio is substantially 1 to 50 and the winding 55 is therefore of relatively low impedance. The circuit arrangement in connection with the feed back winding 55 is such that the capacitor 59 serves to tune the inverter output winding 27 to the output or inverter frequency which may be chosen at 60 cycles and may be variable as shown. The inverter is therefore of the self-oscillating type and serves to supply, by well known inverter action, an alternating current at 60 cycles to the load circuit 9 from the direct current supply mains 11 and 13. The starting of the inverter is adjusted by the contact 53 and is dependent upon the characteristics of the tubes in use.

An alternating potential of a frequency which is a multiple of the chosen inverter frequency is applied to the control grids 23 along with the alternating potential supplied by the inverter oscillatory circuit from a potential source of fixed frequency such as an electrically driven tuning fork oscillator represented at 63. The output potential of the oscillator 63 is applied with a coupling transformer 65 to an electric discharge amplifier 67 having an output coupling choke coil 69.

The amplifier may be of any suitable type and receives anode potential from the mains 11 and 13 through supply leads 70 provided with a filter choke coil 72 and bypass capacitor 74. The output choke coil 69 and the output circuit of the amplifier 67 is coupled through a coupling capacitor 71 with the primary 73 of an input transformer 75. The secondary 77 of the input transformer is connected directly between the control grids 23 of the balanced inverter through leads 79.

In the present example, the tuning fork oscillator 63 through the amplifier 67 is arranged to supply an alternating potential to the control grid 23 at a frequency of 480 cycles, the chosen 60 cycle frequency of the inverter being a submultiple of that frequency. The tuned circuit represented by the coupling capacitor 71 and the primary winding 73 of the inverter controlling frequency input circuit is tuned to pass currents of 480 cycles and to reject any 60 cycle feed back from the grids 23 to the amplifier 67. Likewise, the impedances 45 serve to isolate the inverter oscillatory circuit from the frequency control system and thus to prevent it from loading the frequency control system. With a supply potential limited to the low voltages from the mains 11 and 13, the power output of the amplifier 67 is limited. Therefore, it is desirable to prevent excessive loading of the control system, otherwise the output therefrom may be reduced below the limit of effective control of the rectifier.

In the present example, the series impedances between the control grids of the inverter rectifier devices and the inverter oscillatory circuit are preferably resistors as shown and the oscillatory circuit is tunable by a tuning capacitor 81 connected in shunt relation to the oscillatory input circuit inductance 41 through a variable series resistor 83. The capacitor 81 is of such value that by changing the value of the resistor 83 over its range of control, the oscillatory circuit of the inverter is responsive to a plurality of differing frequencies about the mean frequency of 60 cycles.

The self-excitation of the inverter through the feed back connection and the two impedances 45 is adjusted by a proper effective resistance value of said impedances to reduce the self-excitation to a point where the inverter locks in step with the controlling frequency supplied by the oscillator 63. The resistors or impedances therefore serve to prevent the inverter tubes from oscillating too strongly and to prevent the tubes from drawing too much grid current. The main function, however, is to isolate the inverter oscillatory circuit from the controlling frequency input circuit sufficiently to permit the controlling frequency therefrom to lock the inverter in step with it.

It has been found that by adjusting the resistor 83 and the effectiveness of the capacitor 81 in the oscillatory circuit, the inverter may operate at a plurality of sub-multiple frequencies relative to the controlling frequency, and that the operation changes abruptly from one submultiple frequency to the other progressively as the resistor 83 in varied. For example, in practice, effective and continuous steady operation is obtainable from a 480 cycle controlling frequency with an output frequency of 60, 68, 57, 80, 96 and 120 cycles from the inverter, being the 8th, 7th, 6th, 5th and 4th sub-multiple of the 480 cycle controlling frequency.

It will thus be seen that by varying the resistor 83 progressively the shaft 5 may be caused to rotate at synchronous speed corresponding to 60 cycles or a plurality of other differing fixed synchronous speeds.

The controlling frequency tends to lock in the inverter frequency, as shown in Fig. 2. In this figure alternating components of the grid potential are shown, the 480 cycle wave, being indicated at 85, producing an odd-sub-multiple, such as a 160 cycle wave, indicated at 87. In this case, both waves increase from and decrease toward the zero voltage line 89 in the same direction and the push pull or balanced inverter therefore locks easily in step with a controlling frequency, when the inverter frequency is an odd sub-multiple.

The current flow in the choke coil 39 in the cathode lead produces a double frequency with respect to the inverter frequency at a relatively high potential. This has been found to aid in locking in the inverter when operating at an even sub-multiple of the controlling frequency. The choke coil provides a potential in proper phase relation to the controlling potential, to overcome the condition as indicated at 91 in Fig. 2, when an even sub-multiple potential, represented by the wave 93, is derived from the inverter. It will be seen that at the point 91, the two waves are in opposition, and this opposition will occur in the grid or inverter input circuit, which is common to the choke coil 39. The potential existing across the choke coil tends to maintain the inverter in operation through the zero change-over point 91.

From the foregoing description, it will be seen that a rotatable shaft may be synchronized with an electrically driven tuning fork or other source of constant or standard frequency, by utilizing a frequency dividing oscillatory circuit in connection with a controllable electric discharge inverter of the full wave type, wherein the controlling and inverter oscillatory circuits are substantially isolated by series impedances.

It will be seen that the present system has the advantage that it does not require the usual regulator means for the shaft driving device, such as motor control circuits, field regulation circuits and the like, and obviates the necessity for friction brake types of speed control, which are wasteful of energy. Furthermore, the system does not require additional amplifier and control tubes, but merely utilizes the inverter tubes which are required to supply the power to the load circuit. In any event, the system provides in effect an electrical gear shift means providing a plurality of different speeds, each of which is a synchronous speed, fixed by the single frequency control means, which may be of the type employed as a frequency standard and is therefore non-variable. Such control means is of importance in connection with facsimile recorders which must operate at a synchronous speed.

The system as shown and described has the further advantage that an inverter circuit employing a pair of electro-statically controlled arc rectifiers of the "Thyratron" type may be arranged not only as an inverter for supplying alternating current power from a direct current source but may be utilized as a frequency divider for supplying that power at fixed sub-multiple frequencies with respect to a fixed controlling frequency without the use of complicated additional apparatus, and with only sufficient amplification of the controlling potential to actuate the grids of the inverter system.

I claim as my invention:

1. A power rectifier supply system for a load circuit, comprising in combination, a pair of rectifier devices connected in balanced relation to each other as a power inverter, each of said rectifier devices including a cathode, a control grid and an output anode, means for applying to said control grids in balanced relation to each other a controlling alternating current potential at a predetermined fixed frequency, an output circuit coupled to said load circuit and including step-down transformer means connected in balanced relation with the anodes of said devices, means including a balanced secondary winding of a feed-back transformer providing a balanced input circuit for said control grids, a resistor device providing a connection between each of said grids and said winding, whereby the grids are permitted to operate in response to the fixed frequency oscillations, means for tuning said secondary winding to a sub-multiple of said fixed frequency, including a resistor and a tuning capacitor in series across said winding, said transformer having a primary winding connected with said output circuit, said last-named connection including a variable capacitor for tuning said output circuit, and means for varying the resistance of said resistor thereby to permit the output frequency to vary in steps at predetermined fixed frequencies.

2. In a power supply system of the oscillator-inverter type, the combination of a pair of electric discharge devices each having a grid electrode, a cathode and an anode electrode, means for applying alternating current potential between said grid electrodes at substantially a fixed frequency, said means including a circuit tuned to said last named frequency, means providing an oscillatory circuit for said devices connected with said grid electrodes to provide a balanced or push-pull tuned circuit therebetween, an impedance device connected between each of said grid electrodes and said tuned circuit, whereby said tuned circuit is isolated thereby from said alternating current potential applying means, a balanced or push pull output circuit for said electric discharge devices connected between said anode electrodes, means providing a low impedance feedback coupling between said output circuit and said tuned circuit, and means for applying a positive potential to said grid electrodes with respect to said cathodes.

3. In a power supply system of the oscillator-inverter type, the combination of a pair of electric discharge devices each having a grid electrode, a cathode and an anode electrode, means for applying a controlling alternating current potential between said grid electrodes at substantially a fixed frequency, said means including a circuit tuned to said last named frequency, means providing an oscillatory circuit for said devices connected with said grid electrodes to provide a balanced or push-pull tuned circuit therebetween responsive to sub-multiple frequencies of said controlling frequency, a variable resistor in said tuned circuit for varying the tuning thereof and the output frequency of the inverter, an impedance device connected between each of said grid electrodes and said tuned circuit, whereby said tuned circuit is isolated thereby from said alternating current potential applying means, a balanced or push pull output circuit for said electric discharge devices connected between said anode electrodes, means providing a low impedance feedback coupling between said output circuit and said tuned circuit, and means for applying a positive potential to said grid electrodes with respect to said cathodes.

4. In a power supply system of the oscillator-inverter type, the combination of a pair of electric discharge devices each having a grid electrode, a cathode and an anode electrode, means for applying a controlling alternating current potential between said grid electrodes at substantially a fixed frequency, said means including a circuit tuned to said last named frequency, means providing an oscillatory circuit for said devices connected with said grid electrodes to provide a balanced or push-pull tuned circuit therebetween responsive to sub-multiple frequencies of said controlling frequency, a variable resistor in said tuned circuit for varying the tuning thereof and the output frequency of the inverter, an impedance device connected between each of said grid electrodes and said tuned circuit, whereby said tuned circuit is isolated thereby from said alternating current potential applying means, a balanced or push pull output circuit for said electric discharge devices connected between said anode electrodes, means providing a low impedance feedback coupling between said output circuit and said tuned circuit, means for applying a positive potential to said grid electrodes with respect to said cathodes, and an impedance device in circuit with said cathodes and common to the input and output circuits, whereby the inverter is locked in step more readily when operating at an even sub-multiple of the controlling frequency.

CHARLES J. YOUNG.